Dec. 15, 1931.  H. BECKER  1,836,435
FUEL PUMP FOR ENGINES HAVING A PLURALITY
OF INJECTION VALVES IN THE CYLINDER
Filed Feb. 4, 1929

A-B

C-D

Inventor
Heinrich Becker
Maréchal & Noe
attorneys

Patented Dec. 15, 1931

1,836,435

UNITED STATES PATENT OFFICE

HEINRICH BECKER, OF AUGSBURG, GERMANY, ASSIGNOR TO MASCHINENFABRIK AUGSBURG-NURNBERG, A. G., OF AUGSBURG, GERMANY, A CORPORATION OF GERMANY

FUEL PUMP FOR ENGINES HAVING A PLURALITY OF INJECTION VALVES IN THE CYLINDER

Application filed February 4, 1929, Serial No. 337,280, and in Germany February 18, 1928.

This invention relates to combustion engines operating with fuel injection. One object of the invention is the provision of a fuel injection combustion engine having a plurality of injection valves for each cylinder, the injection valves being individually operated by separate fuel pumps.

Where fuel injection combustion engines having a plurality of injection valves for each cylinder are supplied with fuel so that the fuel is pumped to the several injection areas of a cylinder by a single fuel pump, the system is open to the serious objection that should one fuel conduit become clogged or choked the injection valve to which it supplies fuel becomes inoperative and the entire fuel supply delivered by the pump at each stroke is forced under pressure into the cylinder through the other injection valve or valves. This is undesirable due to the unusual waste of fuel and the interference with the proper injection interval. It is therefore the object of the present invention to provide a construction in which the above-mentioned defects are not present.

Other objects and advantages of the invention will be apparent from the following description and from the accompanying drawings, in which—

Figure 1:
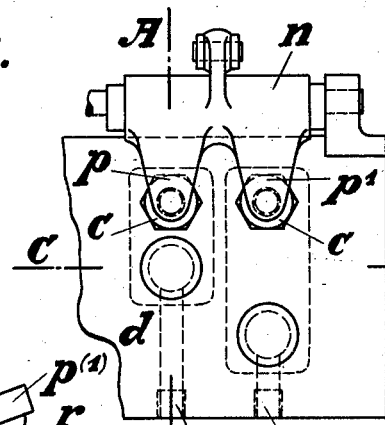
Fig. 1 is a plan view of the fuel pump of an engine cylinder.
Figure 2:
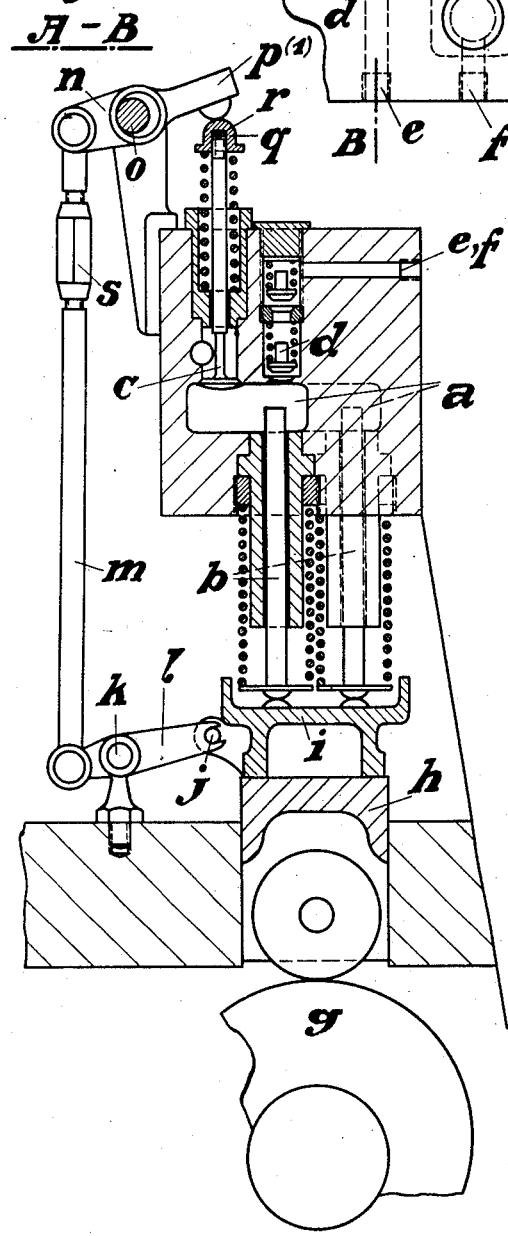
Figs. 2 and 3 are vertical sections taken along the lines A—B and C—D respectively of Fig. 1.
Figure 3:
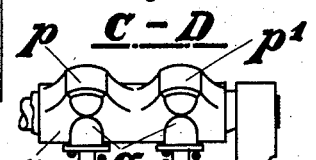
Figure 3:
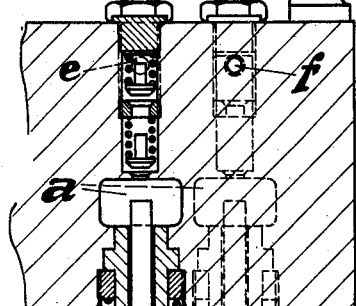
Figure 3:
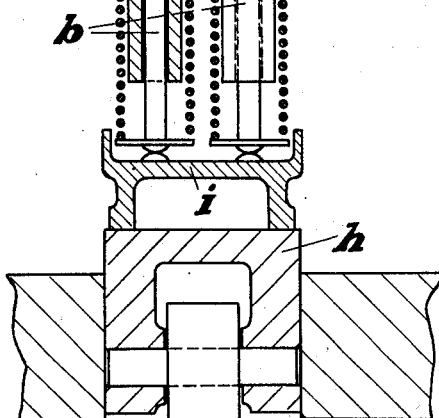

Referring more particularly to the drawings there is shown a fuel pump means for a cylinder of a fuel injection combustion engine having a plurality of injection valves in the cylinder, two such injectors being provided so that each cyinder of the engine has two injection areas. The fuel pump means comprises pumps cor esponding in number to the number of injectors in the cylinder, arranged in a single housing each pump having its own pump chamber $a$, pump rod or plunger $b$, and suction and pressure valves $c$ and $d$ respectively. Both pumps draw the fuel from a common reservoir and force it through proper passages $e$ and $f$ respectively to the two injection valves of the engine cylinder. In the form of the invention illustrated, the fuel pump is adapted to operate with air injection of the fuel, regulation of the timing of fuel injection being obtained by adjustments of the suction valve. Where airless injection is to be provided for the relief or overflow valves are the valves to which the adjustments are applied.

The pumps are driven by the cam $g$ operating a slide $h$ which is provided with a common drive means $i$ for the two pump rods or plungers $b$, this drive means being shown in the form of a cross bridge having an arm $j$ which operates a double armed lever $l$. This lever is preferably pivotally supported by a standard $k$, the free arm of the lever being connected by a link $m$ with a rocker arm $n$ oscillatably supported on an eccentrically arranged bearing $o$. The rocker arm $n$ forms a common operating means for the two valves which govern the fuel injection timing, the arm being provided with two projections $p$ and $p'$ for the two suction valves $c$. The eccentric bearing $o$ may be positively controlled, for instance manually, or by the governor so that the center of oscillation of the rocker arm $n$ is adjusted to provide for adjustments in timing of the suction valves, this adjustment equally and simultaneously affecting both of the suction valves. Such an adjustment permits the regulation of the timing of the suction valves with relation to the operation of the pump plungers $b$.

In order to provide for adjustments of the timing of the two suction valves with relation to each other so that the valves may be opened at the same time, each valve stem $c$ has a cap $q$ properly and adjustably positioned on the stem by means of the shims $r$. By reason of this construction, the adjustments permitted in the timing of the rocker arm $n$, and the synchronized operation of the latter from the common drive means of the pump plungers $b$, the fuel may be supplied to the plurality of injectors of the engine cylinder in the proper manner so that the amount and timing of the fuel at the injection period is properly coordinated. Should one fuel supply passage become clogged this will not interfere with the proper operation of the other injector of the cylinder, and fuel will not be wasted by being forced to any one injection area in excess of the required amounts. Comparatively fine adjustments in the timing of the fuel injection period may be obtained by the individually adjustable means at $q$, but the drive means for the pump plungers being common to the pump means of a cylinder provides a construction such that the various pump plungers operate exactly alike and properly synchronized.

It will be understood that a pump device of the character described is provided for each cylinder of a multicylinder engine, the valve rocker arms $n$ for the various cylinders being mounted in alignment so that they may be simultaneously governed by the common eccentric shaft $o$, which affects all of them equally. Adjusting means is individually provided for each cylinder pump device so that all of the cylinders of the engine may be caused to supply equal power. As shown, this equalization of the power of the various cylinders may be obtained by adjusting the length of the link $m$ by means of the turn buckle adjustment $s$ provided in this link, and which when operated alters the length of the link and thus alters the relative timing of the two valves $c$ with relation to the two pump plungers $b$.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination, a cylinder of a combustion engine, a plurality of fuel injectors for said cylinder, and a plurality of fuel pumps one for each injector, each pump having a pump plunger and a valve, common control means for said pump plungers, common operating means for said valves, mechanism connecting said common drive means with said common operating means, means for adjusting said mechanism for governing the timing of said valves, and means for individually adjusting the timing of said valves.

2. In combination, a cylinder of a combustion engine, a plurality of fuel injectors for said cylinder, a plurality of fuel pumps one for each injector, each fuel pump comprising a pump plunger and valve means, a common cam drive for said pump plungers for moving said plungers a definite and unchanging amount at a definite point in the cycle of operations of the engine, common operating means for said valve means, means for controlling said common operating means to control the duration of the injection period while the time injection starts remains constant, and means for individually adjusting the timing of the valve means of each fuel pump.

In testimony whereof I have affixed my signature.

HEINRICH BECKER.